United States Patent
Legros et al.

(10) Patent No.: US 9,566,841 B2
(45) Date of Patent: Feb. 14, 2017

(54) AIR RIDE SUSPENSION ADAPTER ASSEMBLIES

(71) Applicant: LBC CONTRACTING, LTD., Thunder Bay (CA)

(72) Inventors: Dereck Legros, Thunder Bay (CA); Paul Legros, Thunder Bay (CA)

(73) Assignee: LBC CONTRACTING, LTD., Thunder Bay (CA)

( * ) Notice: Subject to any disclaimer, the term of this patent is extended or adjusted under 35 U.S.C. 154(b) by 0 days.

(21) Appl. No.: 14/722,247

(22) Filed: May 27, 2015

(65) Prior Publication Data
US 2016/0263957 A1    Sep. 15, 2016

(30) Foreign Application Priority Data
Mar. 11, 2015    (CA) ...................................... 2884497

(51) Int. Cl.
*B60G 11/28*    (2006.01)
*B60G 11/27*    (2006.01)
*B60G 11/34*    (2006.01)

(52) U.S. Cl.
CPC ............... *B60G 11/28* (2013.01); *B60G 11/27* (2013.01); *B60G 11/34* (2013.01); *B60G 2202/152* (2013.01); *B60G 2206/80* (2013.01)

(58) Field of Classification Search
CPC ......... B60G 11/28; B60G 11/34; B60G 11/27; B60G 2202/152; B60G 2206/80
See application file for complete search history.

(56) References Cited

U.S. PATENT DOCUMENTS

| | | | |
|---|---|---|---|
| 5,403,032 A * | 4/1995 | Hellwig | B60G 7/04 267/31 |
| 2016/0159192 A1* | 6/2016 | Myers | B60G 11/465 280/124.16 |

* cited by examiner

*Primary Examiner* — Faye M Fleming
(74) *Attorney, Agent, or Firm* — Greer, Burns & Crain, Ltd.

(57) ABSTRACT

An air ride suspension assembly or kit is provided for converting a leaf spring suspension arrangement on a motor vehicle having a solid rear axle to one supported by an air ride suspension assembly is disclosed in order to leverage the benefits of such air ride suspension systems to the conversion suspension assembly is disclosed. A leaf spring is removed and replaced with an upper support arm which is secured to the pre-existing leaf spring attachment sites on the chassis. A mount is then attached to the rear solid axle to which multiple connections are made from the upper support arm including an air bladder. The air ride conversion system can be supplied as a kit for installation by owners of vehicles where they routinely move heavy loads directly with the vehicle or by towing.

11 Claims, 17 Drawing Sheets

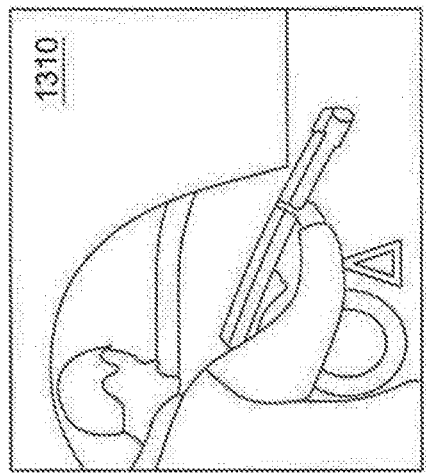
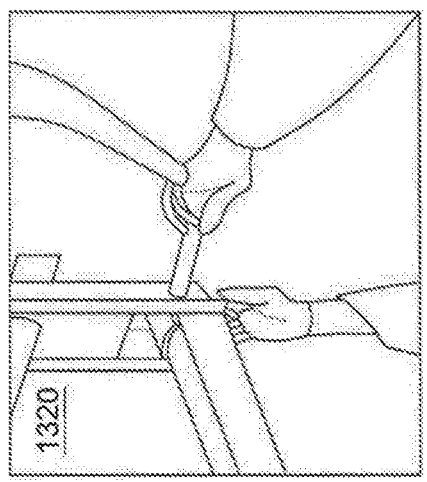
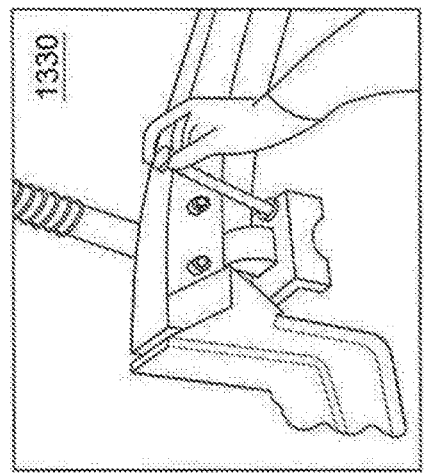
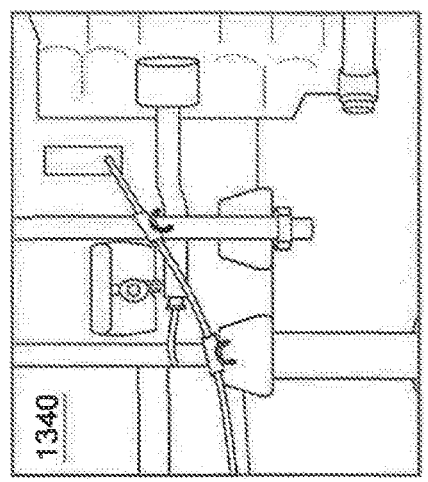
FIG. 13

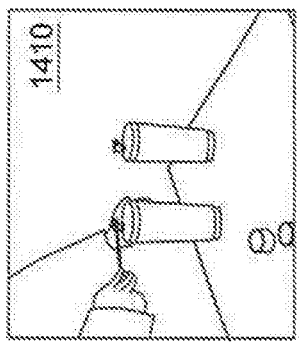
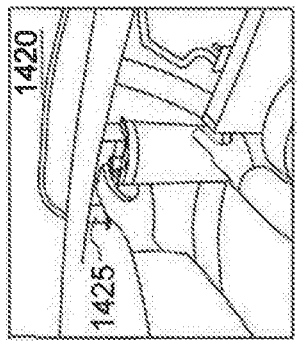
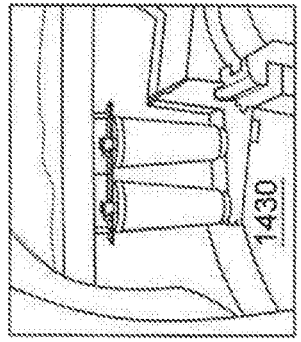
FIG. 14
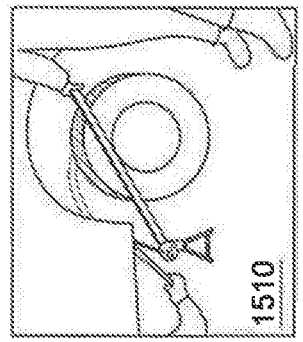
FIG. 15

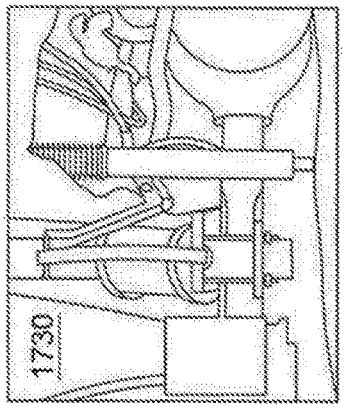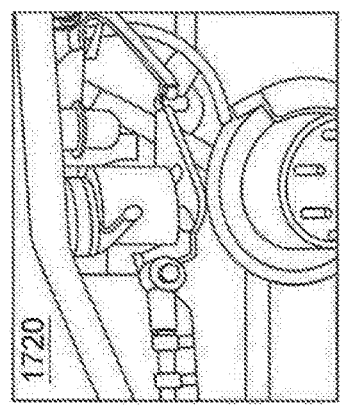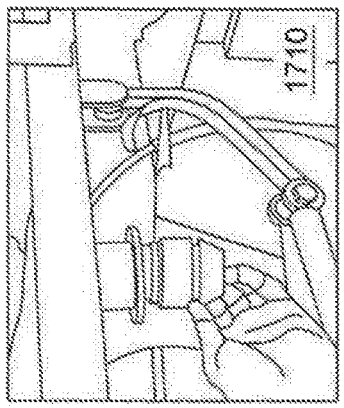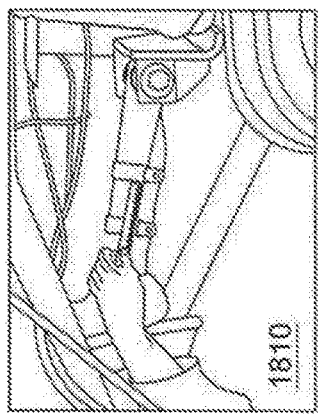
FIG. 17
FIG. 18

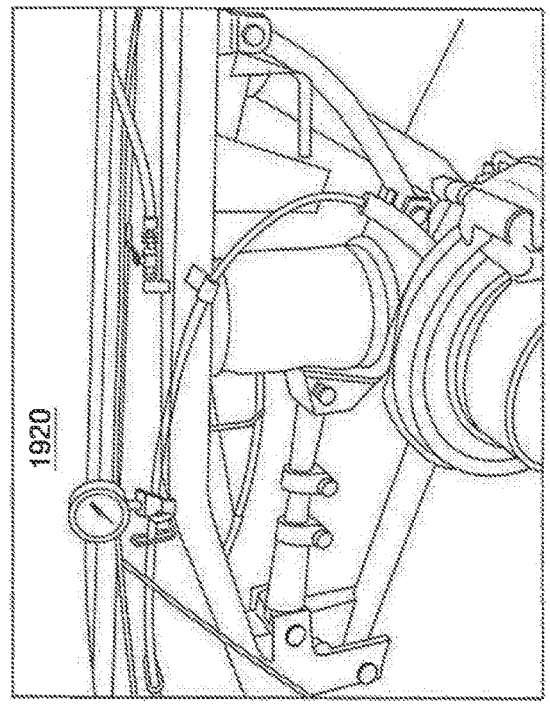
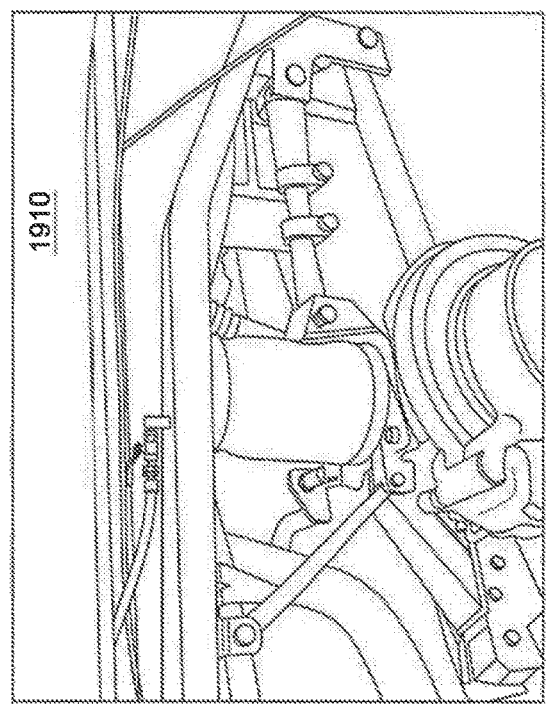
FIG. 19

AIR RIDE SUSPENSION ADAPTER ASSEMBLIES

FIELD OF THE INVENTION

This invention relates to motor vehicle air ride suspension assemblies, and more particularly, to an air ride suspension assemblies or kits for converting an original equipment leaf spring suspension arrangement supporting a solid rear axle of the motor vehicle to one supported by an air ride suspension assembly.

BACKGROUND

A solid rear axle employing a leaf-spring suspension system as the means of attaching the solid rear axle to the chassis of the vehicle is a standard solution employed in a wide range of original equipment supplied motor vehicles such as cars, pick-up trucks and SUV's. Such leaf-spring suspensions provide, during normal usage, for the vehicle chassis to remain relatively level to the ground whilst variations in surface height are absorbed by the leaf-spring suspension in conjunction with shock absorbers. However, when subjected to increased loading, which is generally experienced only or predominantly at the rear axle of the vehicle, then these leaf-spring suspensions allow for the chassis to move downwardly towards the axle under the loading whilst maintaining the suspension's properties of isolating the chassis from the variations in the surface height within the design range of the suspension. However, the result is a chassis that is tilted downwards from front to back such that the vehicles headlights and driver's default vision are elevated away from their normal positions.

In contrast, larger articulated tractor-trailer units and heavy duty trucks typically exploit and are originally equipped with air ride suspension systems which supports the solid rear axle to the vehicle chassis and which include an air ride control system for controlling the air flow into and out of the air bladders in the air ride suspension assembly such that the air ride suspension system maintains the spacing between the axle and chassis at a predetermined distance, or within a predetermined range, regardless of the weight loading experienced by the axle. Accordingly, air ride suspension assemblies of this nature characteristically avoid unwanted rear end depression of the vehicle chassis when undergoing or experiencing increased or heavy loading over the rear axle. As such, air ride suspension systems offer enhanced performance relative to leaf spring suspensions for SUVs, trucks etc. when loaded and/or towing substantial weights.

However, despite the existence of air ride suspension systems, most leading selling SUVs and trucks are only sold by their original equipment manufacturers (OEMs) with leaf spring suspension systems. Accordingly, there exists a requirement for after-sales conversion by owners and operators of motor vehicles equipped with conventional leaf spring suspension systems to air ride suspension assembly thereby providing improved load handling and operational characteristics for their vehicles.

Other aspects and features of the present invention will become apparent to those ordinarily skilled in the art upon review of the following description of specific embodiments of the invention in conjunction with the accompanying figures.

SUMMARY

It is an object of the present invention to mitigate limitations in the prior art relating to motor vehicle air ride suspension assemblies, and more particularly, to an air ride suspension assemblies or kits for converting an original equipment leaf spring suspension arrangement supporting a solid rear axle of the motor vehicle to one supported by an air ride suspension assembly.

In accordance with an embodiment of the invention there is provided an air ride suspension kit formed as a replaceable unit for converting a motor vehicle having a solid rear axle supported by a leaf spring suspension assembly to one supported by an air ride suspension assembly, said kit comprising for a side of the vehicle:

a) an upper support arm to be positioned above the axle and configured for removable attachment in a fixed non-adjustable predetermined location relative to the chassis of the motor vehicle;

b) first and second connectors at each end of the upper support arm, each connector being configured to receive pre-existing leaf spring mounting posts such that when a leaf spring set has been detached and removed from leaf spring attachment sites the upper support arm can be mounted to the leaf attachment sites by at least the leaf spring mounting posts and wherein the first and second leaf spring attachment sites are disposed to the front and rear of the motor vehicle either side of the axle;

c) an upper axle mounting plate and a lower axle mounting plate, each configured for removable attachment to each other and for mounting to the respective top and bottom of the axle in a predetermined location;

d) an upper adjustable support bar for removable attachment between the upper axle mounting plate and a predetermined position on the upper support beam;

e) a lower support bar for removable attachment between the lower axle mounting plate and a predetermined position on the upper support beam; and f) an air bladder forming part of an air control system, wherein the air bladder is disposed between the upper axle mounting play and the upper support beam.

In accordance with an embodiment of the invention there is provided an air ride suspension kit formed as a replaceable unit for converting a motor vehicle having a solid rear axle supported by a leaf spring suspension assembly to one supported by an air ride suspension assembly, said kit comprising:

first and second air ride suspension assemblies for each side of the vehicle, each air ride suspension assembly comprising:

a) an upper support arm to be positioned above the axle and configured for removable attachment in a fixed non-adjustable predetermined location relative to the chassis of the motor vehicle;

b) first and second connectors at each end of the upper support arm, each connector being configured to receive pre-existing leaf spring mounting posts such that when a leaf spring set has been detached and removed from leaf spring attachment sites the upper support arm can be mounted to the leaf attachment sites by at least the leaf spring mounting posts and wherein the first and second leaf spring attachment sites are disposed to the front and rear of the motor vehicle either side of the axle;

c) an upper axle mounting plate and a lower axle mounting plate, each configured for removable attachment to each other and for mounting to the respective top and bottom of the axle in a predetermined location;

d) an upper adjustable support bar for removable attachment between the upper axle mounting plate and a predetermined position on the upper support beam;

e) a lower support bar for removable attachment between the lower axle mounting plate and a predetermined position on the upper support beam; and f) an air bladder forming part of an air control system, wherein the air bladder is disposed between the upper axle mounting play and the upper support beam; and a sway bar for connecting between the first and second air ride suspension assemblies at predetermined locations on each once the first and second air ride suspension assemblies have been mounted to the vehicle.

In accordance with an embodiment of the invention there is provided a method of converting the rear suspension of a motor vehicle comprising:

removing left and right leaf spring assemblies from their locations;

assembling an air ride suspension kit in place of the left and right leaf spring assemblies, said kit comprising:

a) an upper support arm to be positioned above the axle and configured for removable attachment in a fixed non-adjustable predetermined location relative to the chassis of the motor vehicle;

b) first and second connectors at each end of the upper support arm, each connector being configured to receive pre-existing leaf spring mounting posts such that when the leaf spring set are detached and removed from leaf spring attachment sites the upper support arm can be mounted to the leaf attachment sites by at least the leaf spring mounting posts and wherein the first and second leaf spring attachment sites are disposed to the front and rear of the motor vehicle either side of the axle;

c) an upper axle mounting plate and a lower axle mounting plate, each configured for removable attachment to each other and for mounting to the respective top and bottom of the axle in a predetermined location;

d) an upper adjustable support bar for removable attachment between the upper axle mounting plate and a predetermined position on the upper support beam;

e) a lower support bar for removable attachment between the lower axle mounting plate and a predetermined position on the upper support beam; and f) an air bladder forming part of an air control system, wherein the air bladder is disposed between the upper axle mounting play and the upper support beam; and assembling an air system onto the motor vehicle, said system comprising:

g) an air tank and air tank mounting brackets for mounting the air tank to the motor vehicle to provide air under pressure to the air bladders when the air ride suspension is installed and operational;

h) an air compressor and compressor mounting brackets for mounting the air compressor to the motor vehicle and maintaining the air within the air tank at a predetermined minimum pressure when the air ride suspension is installed and operational;

i) a sensor linked to a control system for controlling the air compressor;

j) a control valve for controlling at least one of the ingress and egress of air with respect to the air bladders; and k) tubing to link the air compressor, the air tank, the control valve, and the air bladders in predetermined configuration.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 13 to 15 depict sequences of steps described by process blocks within FIGS. 10 and 12 for an SMIS air ride suspensions according to U.S. Pat. No. 8,870,203 by the inventors or an embodiment of the invention after the sequence of steps depicted in FIG. 11;

FIGS. 16 to 18 depict sequences of steps described by process blocks within FIGS. 10 and 12 for an SMIS air ride suspensions according to embodiment of the invention after the sequence of steps depicted in FIG. 11; and FIG. 19 depicts the SMIS air ride suspensions according to embodiment of the invention after installation.

DETAILED DESCRIPTION

The present invention is directed to motor vehicle air ride suspension assemblies, and more particularly, to an air ride suspension assemblies or kits for converting an original equipment leaf spring suspension arrangement supporting a solid rear axle of the motor vehicle to one supported by an air ride suspension assembly.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Within the ensuing description an air ride suspension system (ARSS) intended for secondary market installation/sales (SMIS) is described and depicted with respect to exemplary embodiments of the invention. With respect to FIGS. 1 to 4 and the design of the upper support arm the design depicted represents one for a Ford F-250 although it would be evident to one skilled in the art that the principles described are applicable to other trucks, SUVs, and vehicles through adjustment in the design/dimensions.

Figure 1:
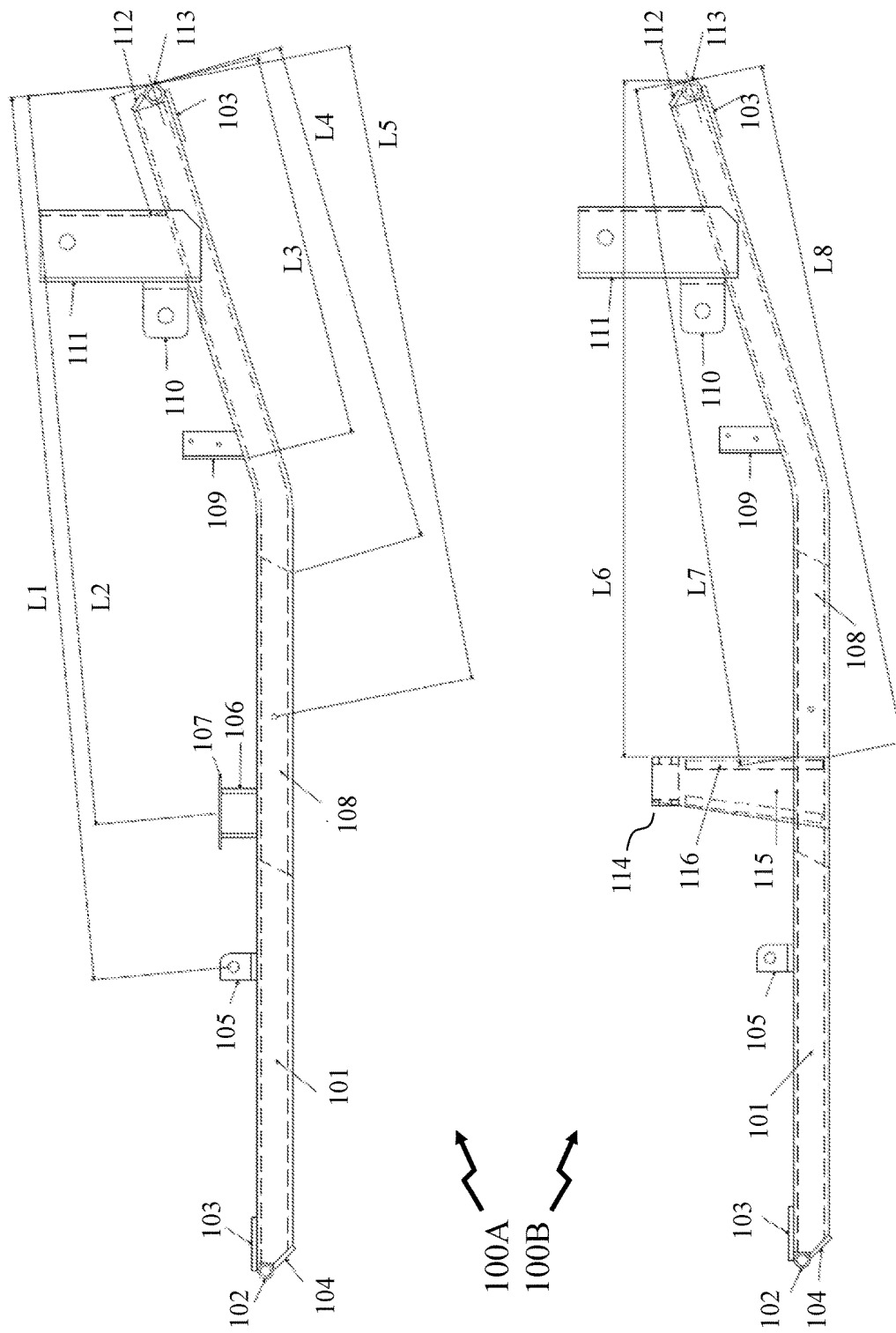
FIG. 1 depicts upper support arm variants for secondary market installation/sales (SMIS) for a leading North American truck according to an embodiment of the invention.

Referring to FIG. 1 there are depicted first and second upper support arms 100A and 100B for SMIS ARSS for the F-250 truck according to an embodiment of the invention wherein first upper support arm 100A is mounted to the left hand side (LHS) of the F-250 and second upper support arm 100B is mounted to the right hand side (RHS) of the F-250. Each of the first and second upper support arm variant 100A and 100B comprises:

High strength steel (HSS) tube 108;
First leaf spring mount 102;
Support plates 103;
First blanking plate 104;
Mounting bracket 105;
Stop housing 106 and stop housing bushing 107 (not depicted for clarity on second upper support arm variant 100B but depicted on first upper support arm 100A);
First mount 109;
Second mount 110 which is attached to third mount 111;
Second blanking plate 112; and
Second leaf spring mount 113.
Second upper support arm variant 100A also comprises:
Fitting 114;
Plate 115; and
Supports 116.

As noted, each of the depicted first and second upper support arm variants 100A and 100B respectively with appropriate dimensions L1 to L8 are intended to SMIS ARSS to an F-250. The dimensions L1 to L8 as well as those of elements including, but not limited to, second and third mounts 110 and 111 respectively, first and second leaf spring mounts 102 and 113 respectively, first mount 109 and plate 115.

Figure 2:
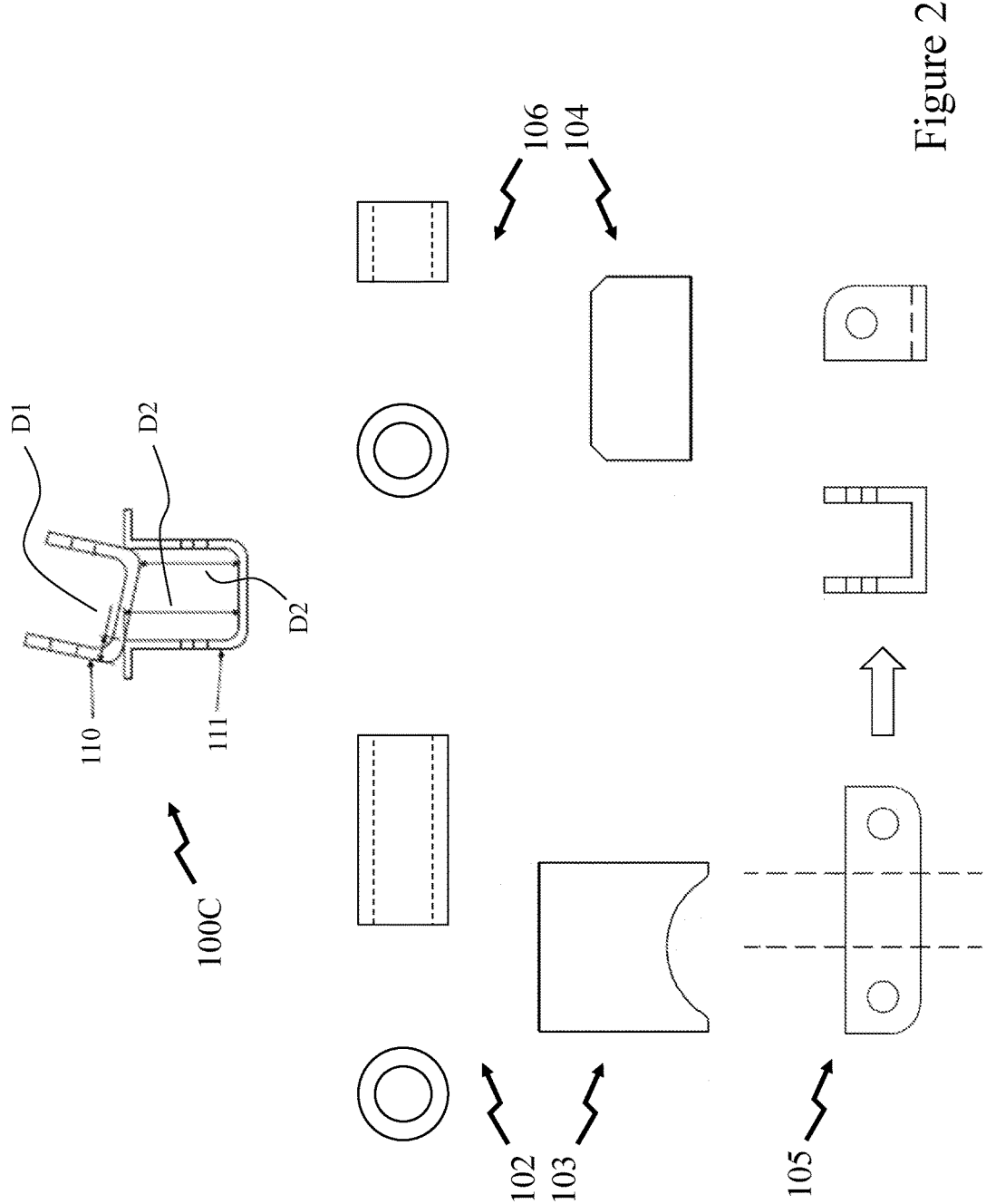
FIGS. 2 to 4 depict individually the elements added to a rectangular frame in order to form the upper support arm variants depicted in FIG. 1 for a SMIS air ride suspension system (ARSS) according to an embodiment of the invention.
Figure 3:
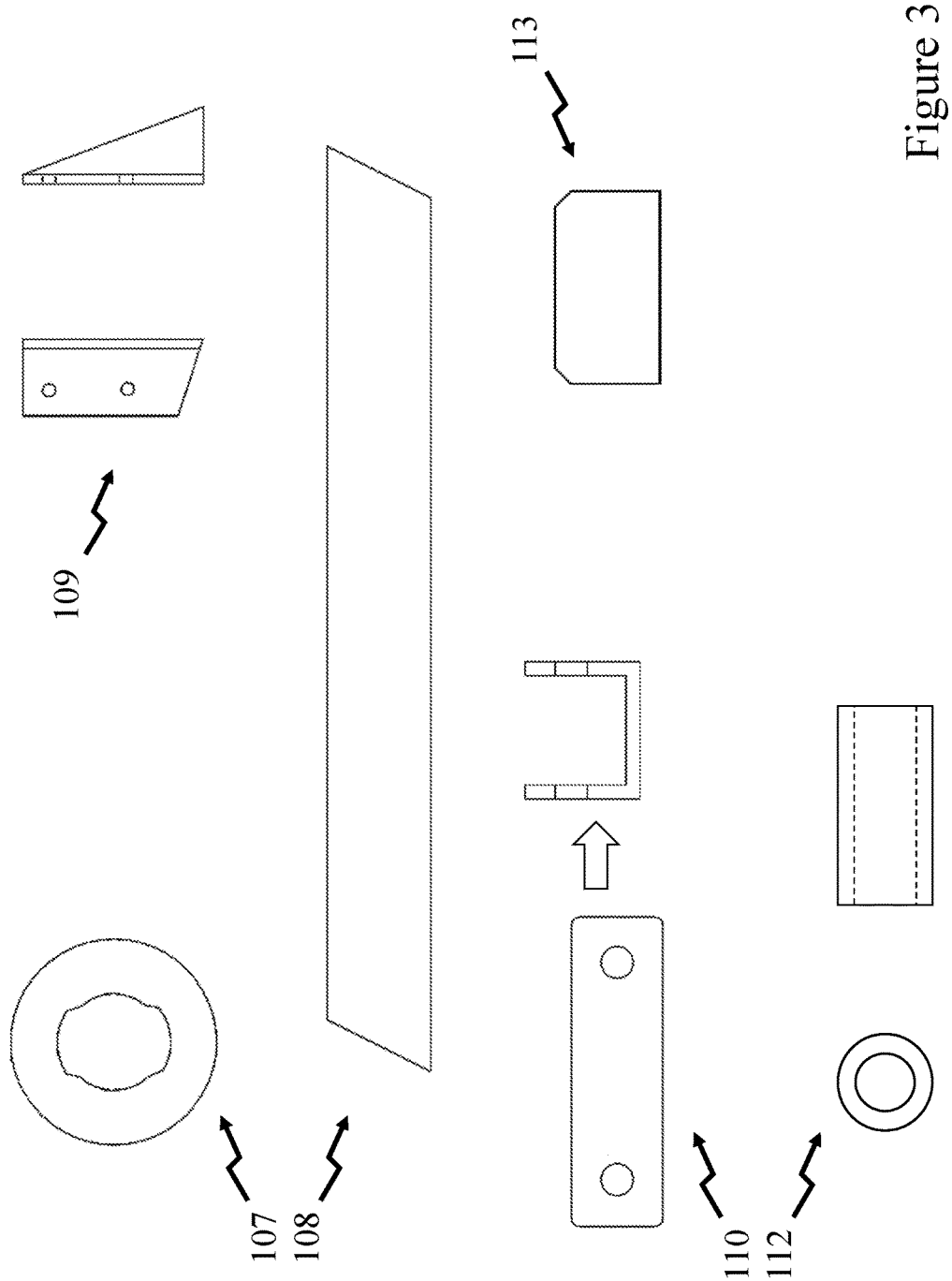
Figure 4:
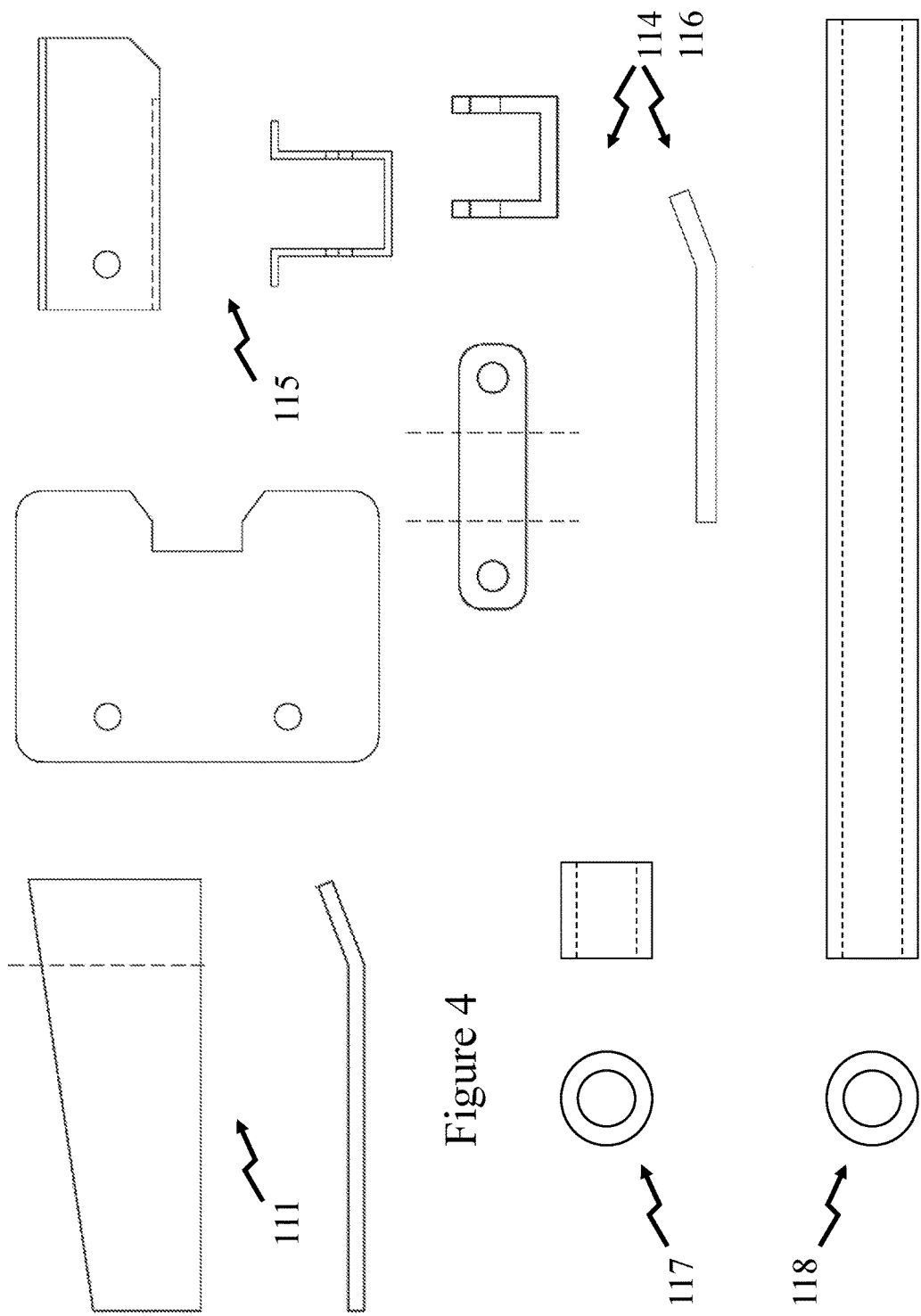

FIGS. 2 to 4 depict individually these multiple elements added to the HSS tube 108 forming the primary element within first and second upper support arm variants 100A and 100B respectively. The HSS tube 108 is 78 inches long and cross-section 3×2×¼ inch. These other elements being:

First leaf spring mount 102 of ⅞ inch diameter circular pipe with ⅛ inch wall and length 3½ inches;
Support plates 103 of thickness ¼ inch and 3×3 inch;
First blanking plate 104 of thickness ¼ inch and 3×1⅝ inch;
Mounting bracket 105 of thickness 5/16 inch and 3×1½ inch which is profiled by bending;
Stop housing 106 of 2¾ inch diameter circular pipe with ¼ inch wall and length 3½ inches and stop housing bushing 107 of diameter 4 inches and thickness ⅛ inch with inner diameter of 2¼ inches;
First mount 109 comprising L-shaped 1½×1½×3/16 inches and length 3½ inches;
Second mount 110 of plate ⅜×2½ inch and length 8½ inches which is attached to third mount 111 of plate ¼×12 inch and length 9 inches, wherein both are profiled and bent to shape;
Second blanking plate 112 ¼×1 inch and length 3 inches; and
Second leaf spring mount 113 of 1⅛ inch diameter circular pipe with 3/16 inch wall and length 3½ inches;
Fitting 114 plate ⅜×1½ inch and length 6 inches which is profiled and bent to shape;
Plate 115 of dimensions ⅜×4 inch and length 10 inches which is profiled and bent to shape;
Supports 116 which are ½ inch diameter rods of length 8¼ inches.

Figure 5:
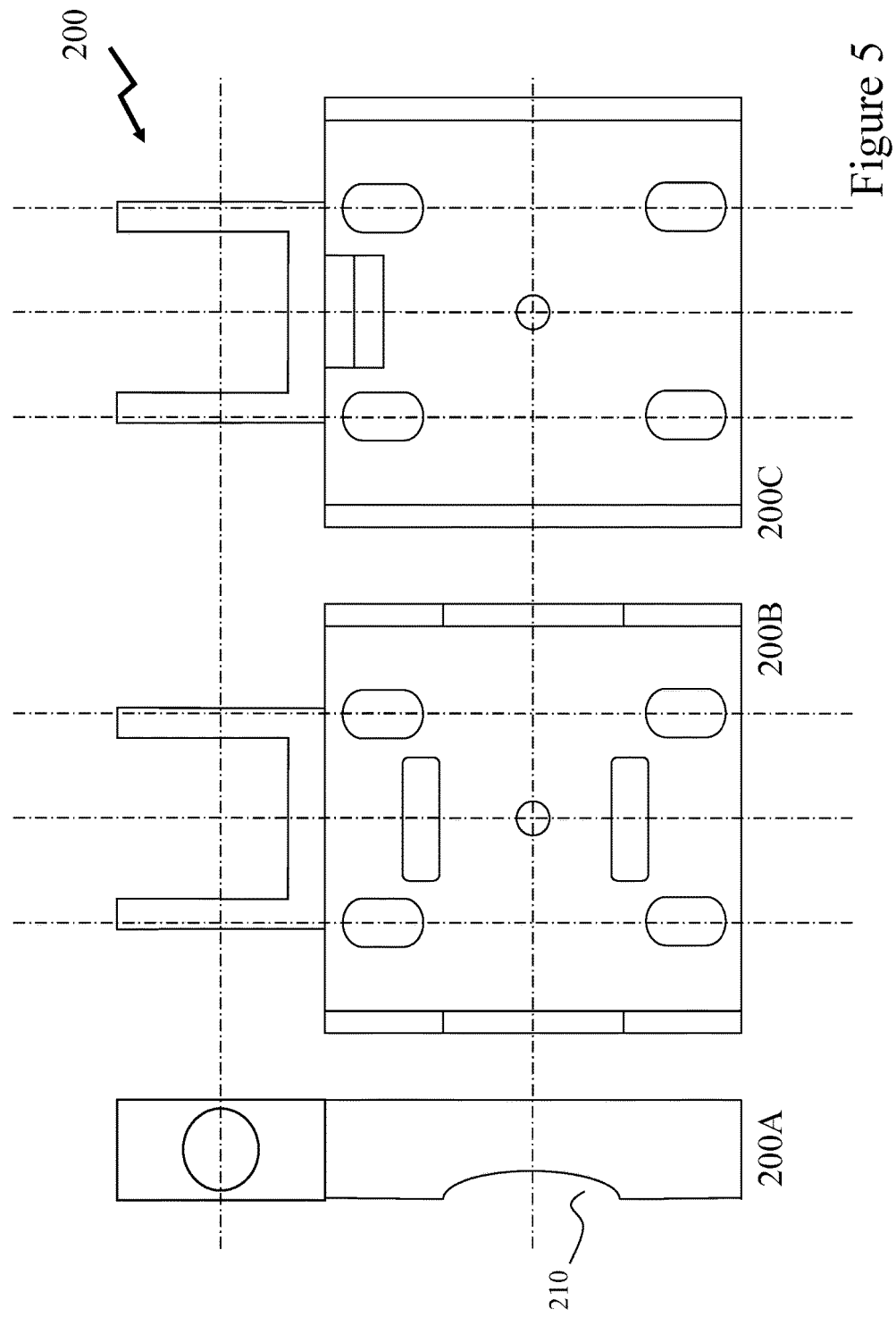
FIGS. 5 and 6 depict axle mounting brackets for a SMIS air ride suspension system (ARSS) according to an embodiment of the invention.
Figure 6:
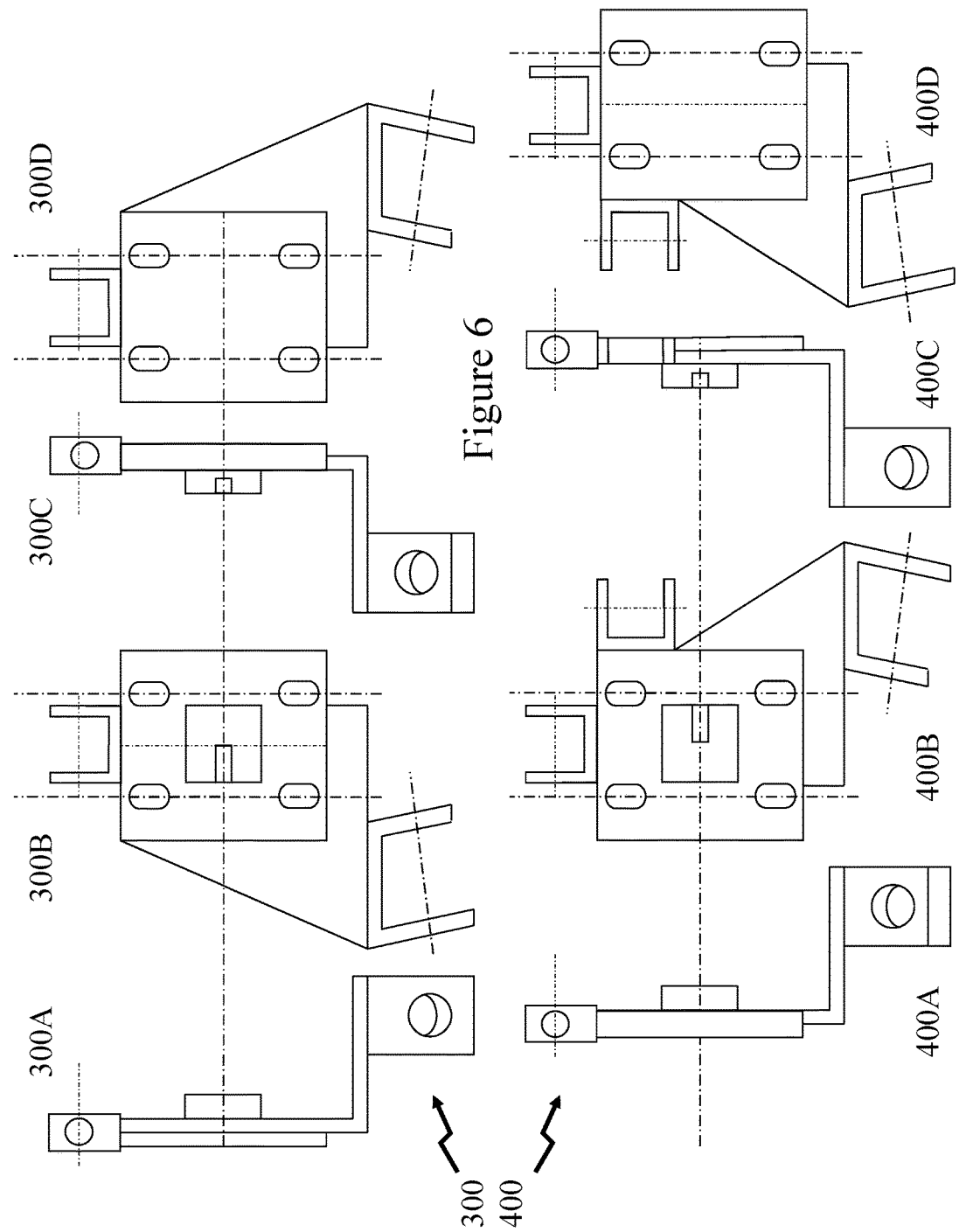

Now referring to FIGS. 5 and 6, there are depicted axle mounting brackets for a SMIS air ride suspension system (ARSS) according to an embodiment of the invention. In FIG. 5, the lower axle mounting bracket 200 is depicted in first to third views 200A to 200C respectively for the side elevation, front elevation and rear elevation. As evident, lower axle mounting bracket 200 comprises recess 210 which mates to the lower portion of the circular rear axle. FIG. 6 depicts first and second axle mounting brackets 300 and 400 respectively for the left and right hand sides of the truck. First axle mounting bracket 300 is depicted in first side elevation 300A, front elevation 300B, second side elevation 300C, and rear elevation 300D. Second axle mounting bracket 400 is depicted in first side elevation 400A, front elevation 400B, second side elevation 400C, and rear elevation 400D. As depicted, each comprises a central plate to which are attached a first mounting "U" element and an angled bracket. Each of the angled brackets has attached an angled second "U" element with mounting holes of axis relative to the mounting bracket.

Figure 7:
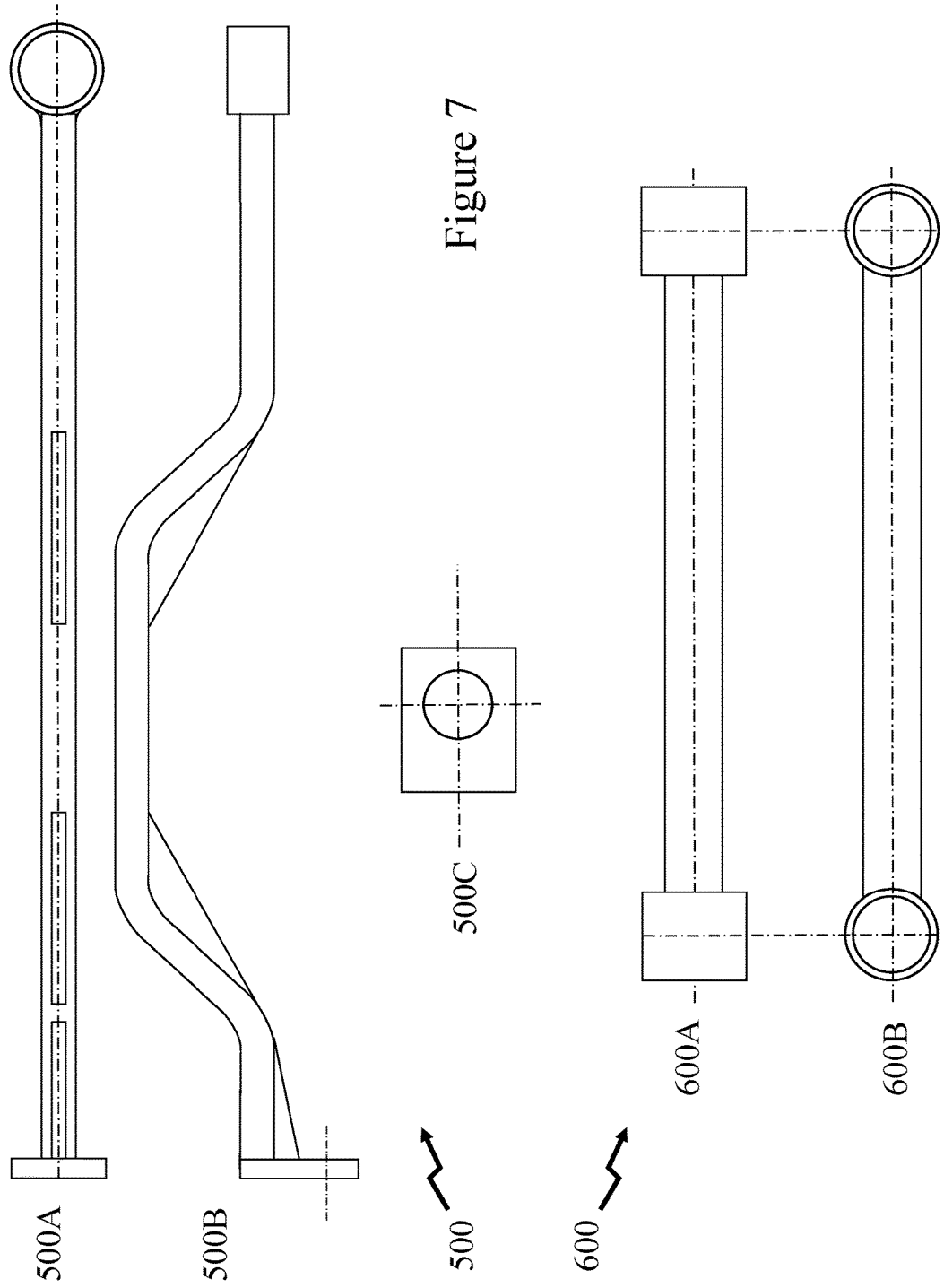
FIG. 7 depicts sway bar and lower axle support bars for a SMIS air ride suspension system (ARSS) according to an embodiment of the invention.
Figure 8:
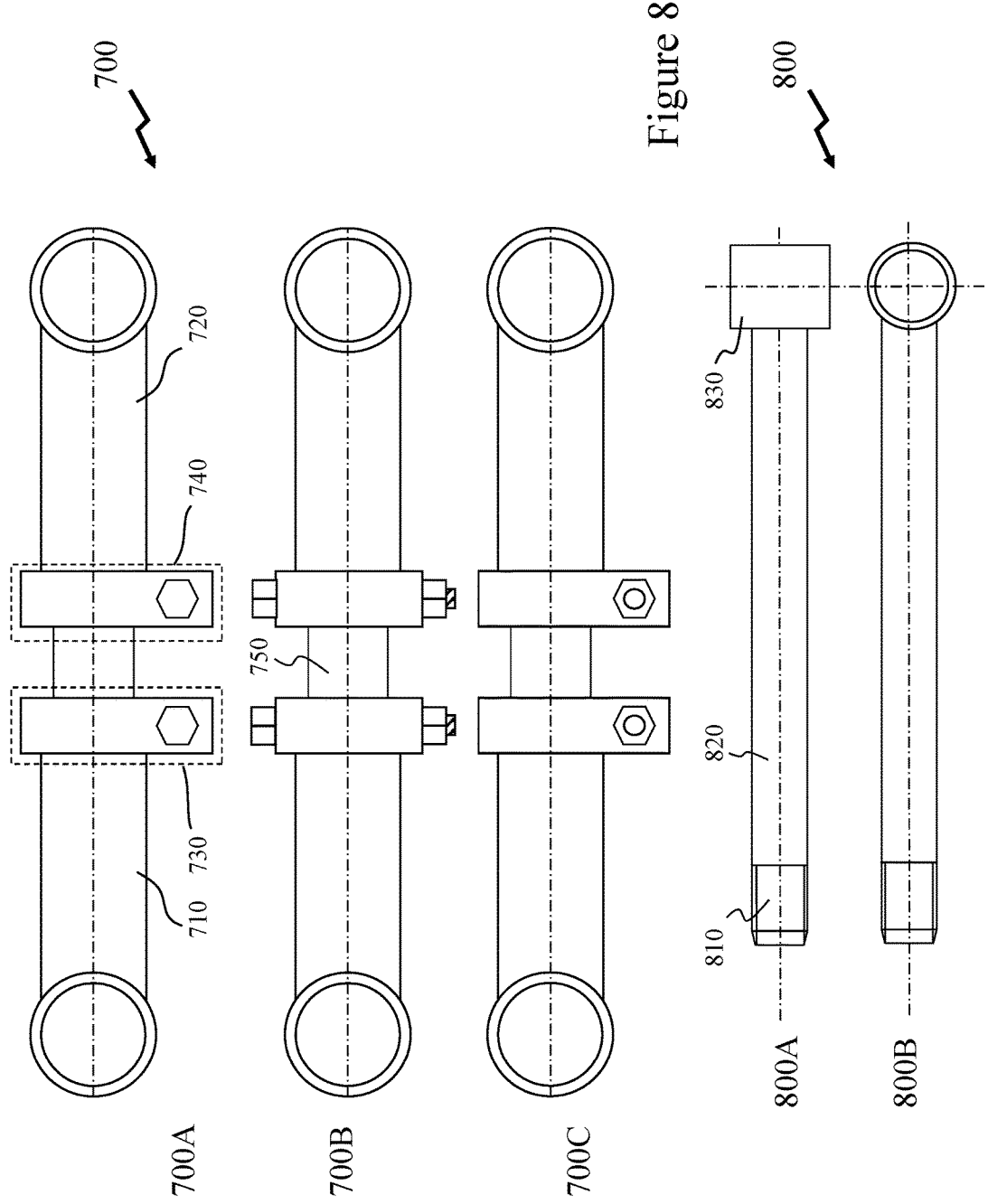
FIG. 8 depicts upper adjustable axle support bar and sway bar adjustment bar for a SMIS air ride suspension system (ARSS) according to an embodiment of the invention.

Now referring to FIG. 7, there are depicted sway bar 500 and lower axle support bar 600 for a SMIS ARSS according to an embodiment of the invention. As depicted, sway bar 500 is presented in first to third views 500A to 500C representing plan, front, and end elevations respectively. Lower axle support bar 600 is depicted in plan view 600A and front view 600B respectively. Referring to FIG. 8, there are depicted upper adjustable axle support bar 700 and sway bar adjustment bar 800 for a SMIS ARSS according to an embodiment of the invention. Upper adjustable axle support bar 700 is depicted in top elevation 700A, front elevation 700B, and bottom elevation 700C as comprising first and second mounting elements 710 and 720 with clamping regions 730 and 740 respectively as mounted to central rod 750. Sway bar adjustment bar 800 is depicted in first and second views 800A and 800B representing plan and front elevations respectively. As depicted, the sway adjustment bar 800 comprises a mounting element 830, rod 820, and threaded rod portion 810.

Figure 9:
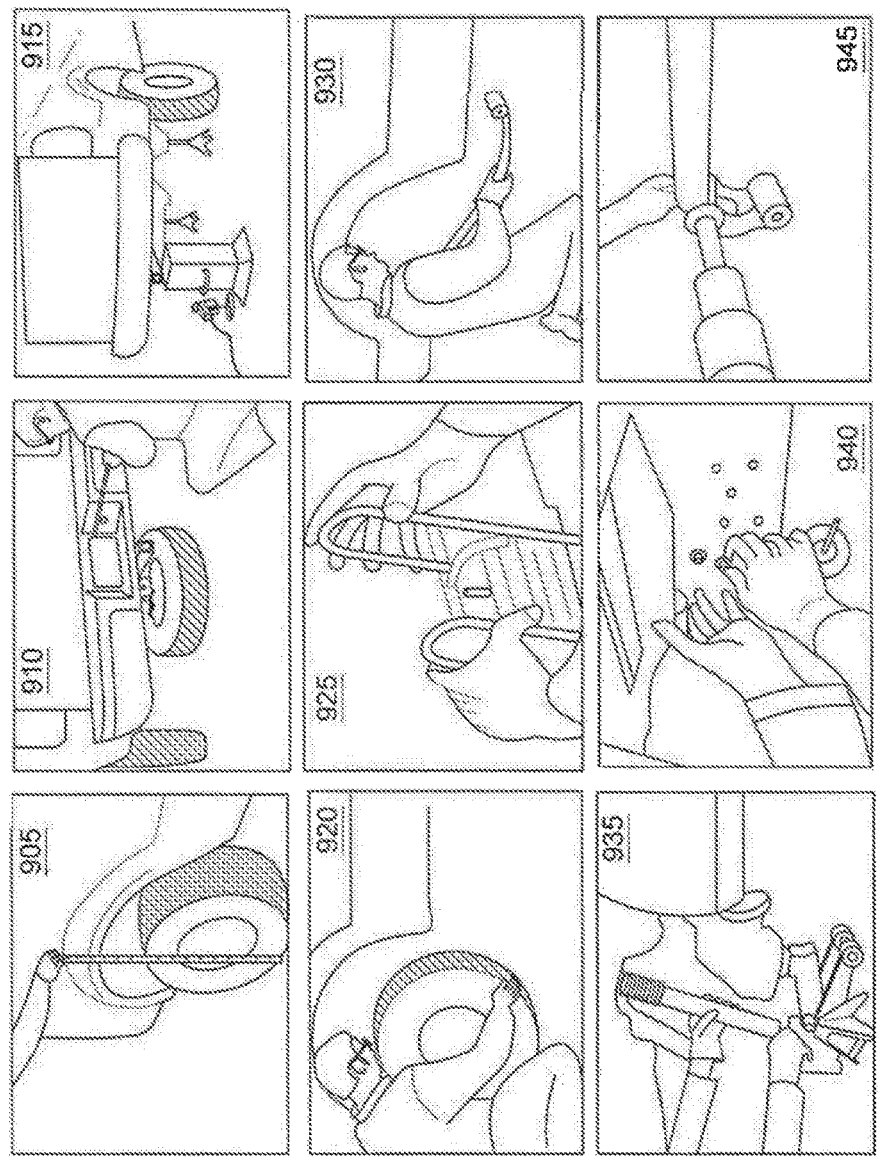
FIG. 9 depicts a sequence of steps for the removal of an OEM leaf-spring suspension according to an embodiment of the invention.

Referring to FIG. 9, there is depicted a flow 900 depicting a sequence of steps 905 to 945 for the removal of an OEM leaf-spring suspension for the subsequent installation of an SMIS ASRSS according to an embodiment of the invention. As depicted, once the installer has identified and purchased the correct SMIS ARSS kit for the vehicle being modified, then they:

First step 905 wherein the installer measures the ride height of the vehicle and the pinion angle;
Second step 910 comprising removal of spare tire for easy install if located in a position impacting access to the rear axle;
Third step 915 with lift the rear of the vehicle off the ground and securing it;
Fourth step 920 with removal of both rear tires;
Fifth step 925 with removal of the U-bolts holding the leaf springs in position;

Sixth step 930 wherein the leaf springs are removed from both sides of the vehicle;

Seventh step 935 wherein the OEM shock absorbers are removed;

Eighth step 940 wherein, for a Ford and potentially other OEM vehicles/brands, helper spring brackets are removed; and Ninth step 945 wherein the rear leaf spring shackles are removed from the leaf springs and are attached to the rear of each upper support arm.

Optionally, any OEM installed sway bar is removed during this dismantling of the OEM installed rear leaf spring assemblies. Now referring to FIG. 10, there is depicted a flow 1000 depicting the initial sequence of installing through steps 1010 to 1070 a SMIS ASRSS according to an embodiment of the invention. From process flow 900 the flow 1000 proceeds to first step 1010 wherein the installer installs the first and second upper support arms 100A and 100B to the vehicle on the left and right hand sides of the vehicle. If the installer is installing a SMIS ARSS according to the design presented by the inventors within U.S. Pat. No. 8,870,203 entitled "Vehicle Leaf Spring to Air-Ride Suspension Conversion Assembly" (referred to as "AutoFlex") then the flow 1000 proceeds via first flow 1300, second step 1020 associated with flow 1300 in FIG. 13, third and fourth steps 1040 and 1050 respectively, and fifth step 1060 associated with flow 1400 in FIG. 14 before proceeding to flow 1100 in FIG. 11. If the installer is installing a SMIS ARSS according to an embodiment of the invention (referred to as "Ultra") then the flow 1000 proceeds via sixth step 1030 associated with flow 1600 in FIG. 16, third and fourth steps 1040 and 1050 respectively, and seventh step 1070 associated with flow 1700 in FIG. 17 before proceeding to flow 1100 in FIG. 11.

Figure 11:
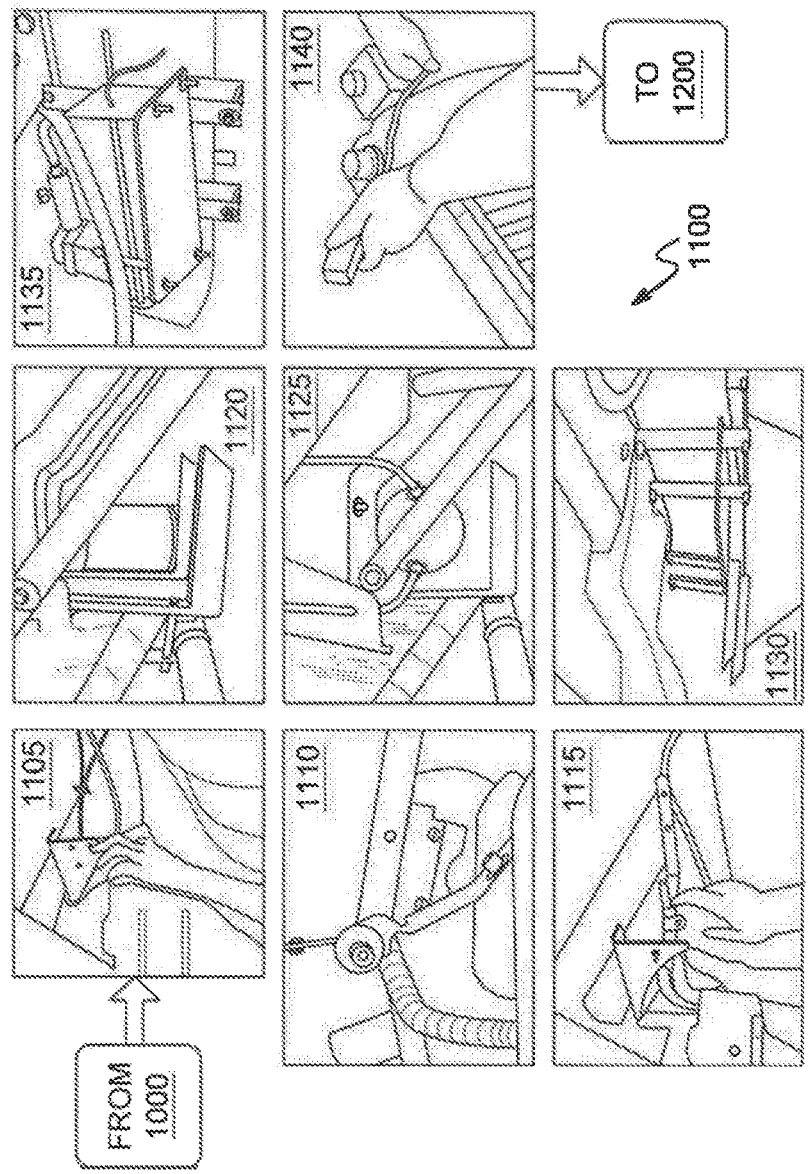
FIG. 11 depicts a sequence of steps for the addition of the air compressor/pump and air tank for control system SMIS air ride suspensions according to either U.S. Pat. No. 8,870,203 by the inventors or an embodiment of the invention after the flow depicted in FIG. 10 has been completed.

Third step 1040 relates to installation of the sway bar 500 together with sway adjustment bar 800 which is left loose at this point and fourth step 1050 relates to the installation of the new shock absorbers onto the vehicle. From flow 1000 the process proceeds to flow 1100 in FIG. 11 depicting the sequence of steps for the addition of the air compressor/pump and air tank for an SMIS ARSS which are common to both the AutoFlex SMIS ARSS according to U.S. Pat. No. 8,870,023 by the inventors and the Ultra SMIS ARSS according to embodiments of the invention. As depicted, flow 1100 comprises first to eighth steps 1105 to 1140 wherein the installer:

First step 1105 wherein the installer installs a leveling valve bracket to front side of spare tire rack facing to the front of the vehicle (leveling valve bracket not depicted within FIGS. 1 to 8);

Second step 1110 comprising installing an adjustable link tab to the axle housing;

Third step 1115 wherein leveling valve and adjustable link are bolted for adjustment later;

Fourth step 1120 with installation of the air tank brackets on chassis on the passenger side;

Fifth step 1125 with installation of the air tank with its two ports facing rear;

Sixth step 1130 wherein installation of the air compressor bracket to frame is made, this being close to air tank;

Seventh step 1135 wherein the air compressor is installed; and

Eighth step 1140 wherein the wiring harness is run from compressor to front of vehicle on the driver's side and the wiring connected to the vehicle's electrical system.

Figure 12:
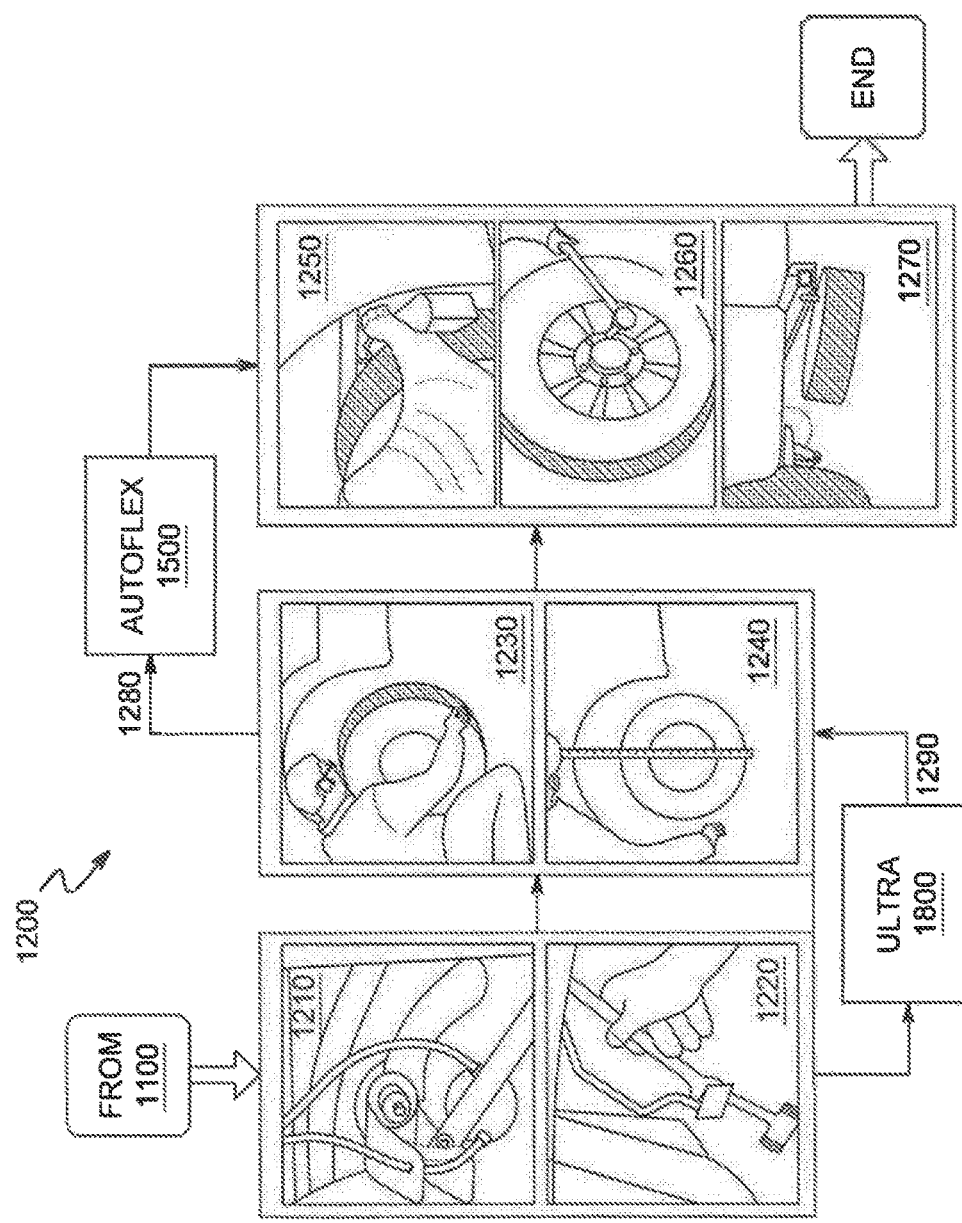
FIG. 12 depicts a flow schematic for the remainder of the installation sequences for SMIS air ride suspensions according to either U.S. Pat. No. 8,870,203 by the inventors or an embodiment of the invention after the sequence of steps depicted in FIG. 11.

Now referring to FIG. 12, there is depicted a flow 1200 for the remainder of the installation sequence for an SMIS ARSS wherein flow 1200 follows from flow 1100 in FIG. 11.

As depicted, the installer performs first and second steps 1210 and 1220 before progressing. Within first step 1210 the installer runs the air lines from the air tank to the left and right hand airbags whilst in second step 1220 the installer adjusts the sway bar 700, measures from the vehicle frame to hub face on either side and tightens via sway adjustment bar 800. If the installer is installing a SMIS ARSS according to the design presented by the inventors within U.S. Pat. No. 8,870,203 entitled "Vehicle Leaf Spring to Air-Ride Suspension Conversion Assembly" (referred to as "AutoFlex") then the flow 1200 proceeds via third and fourth steps 1230 and 1240 respectively, first flow 1280 associated with flow 1500 in FIG. 15, and fifth to seventh steps 1250 to 1270 respectively. If the installer is installing a SMIS ARSS according to an embodiment of the invention (referred to as "Ultra") then the flow 1200 proceeds via second flow 1290 associated with flow 1800 in FIG. 18, and steps third to seventh steps 1230 to 1270 respectively. In each instance the installation is complete.

Accordingly, third to seventh steps 1230 to 1270 respectively are:

Third step 1230 wherein the installer installs the rear wheels;

Fourth step 1240 wherein the installer sets the ride height, measures the vehicle, and sets via the adjustable link;

Fifth step 1250 wherein the installer checks for leaks on the air system;

Sixth step 1260 wherein the rear wheels are torqued to factory specifications; and Seventh step 1270 wherein the spare wheel is re-installed into its original place in the frame under the rear of the vehicle.

Figure 10:
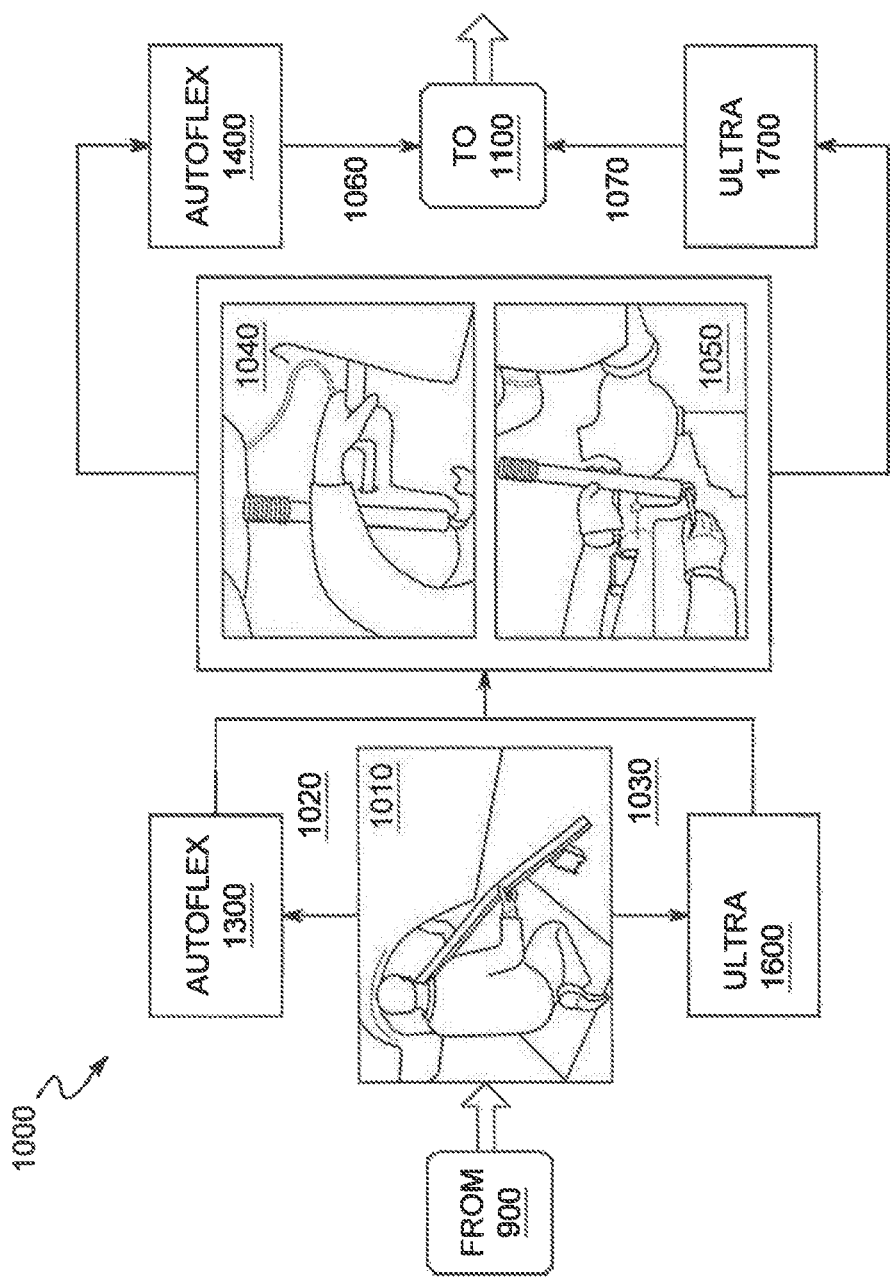
FIG. 10 depicts a flow schematic for the initial sequence of installing an upper support arm and installing SMIS air ride suspensions according to either U.S. Pat. No. 8,870,203 by the inventors or an embodiment of the invention.

Referring to FIGS. 13 to 15, there are depicted flows 1300 to 1500 representing the sequences of steps associated with these flows within FIGS. 10 and 12 for an SMIS air ride suspensions according to U.S. Pat. No. 8,870,203 by the inventors. Referring to FIG. 13, flow 1300 comprises first to fourth steps 1310 to 1340 wherein:

First and second steps 1310 and 1320 wherein the installer installs trailing arms to each of the first and second upper support arms 100A and 100B respectively;

Third step 1330 wherein the installer installs bolts into the pivot to the axle;

Fourth step 1340 wherein each trailing arm is tightened to the axle through the bolts.

Now referring to flow 1400 in FIG. 14, this comprises first to third steps 1410 to 1430 comprising:

First step 1410 wherein the fittings are installed to the air bladders;

Second and third steps 1420 and 1430 respectively wherein the two airbags are installed on the trailing arm ledge such that they are disposed between the ledge of the trailing arm and the bottom of the upper support arm.

The upper bracket 1425 between the airbags on the left and right sides and the first and second upper support arms 100A and 100B respectively in the SMIS ARSS kit for the AutoFlex approach may be bolted to first and second upper support arms 100A and 100B respectively allowing a common design of upper support arm to be employed in both AutoFlex and Ultra configurations. Referring to flow 1500 in FIG. 15, this comprises step 1510 wherein the bolts on the trailing arms are torqued to the specification of the AutoFlex specifications.

Figure 16:
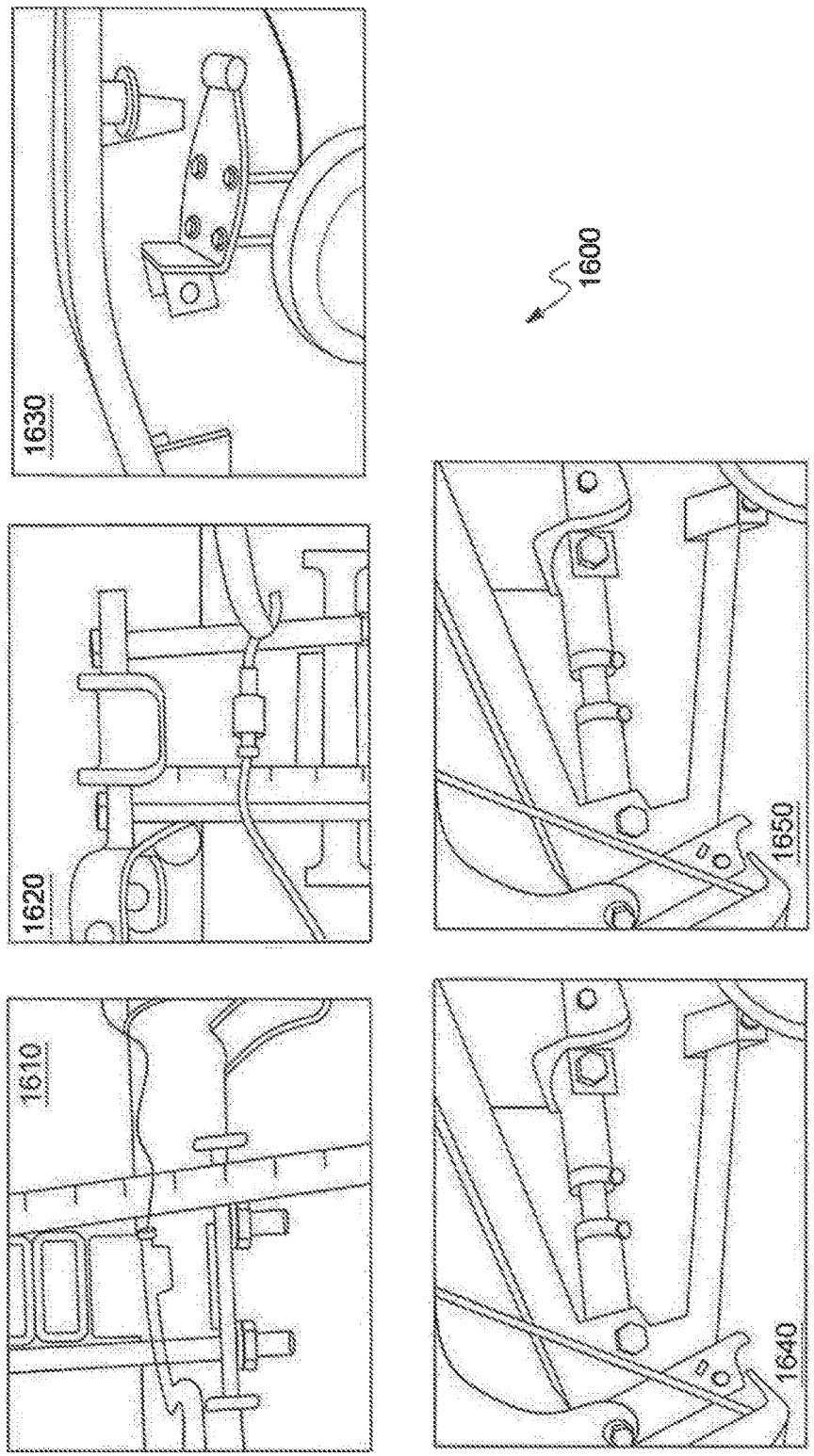

Now referring to FIGS. 16 to 18, there are depicted flows 1600 to 1800 representing the sequences of steps associated with these flows within FIGS. 10 and 12 for an SMIS air ride suspensions according to an embodiment of the invention. Referring to FIG. 16, flow 1600 comprises first to fifth steps 1610 to 1650 wherein:

First and second steps 1610 and 1620 wherein the installer mounts on the lower side of the rear axle on both left and right sides a lower axle mounting bracket 200 and on the upper side of the rear axle on the left and right sides the respective one of the first and second upper axle mounting brackets 300 and 400 respectively;

Third step 1630 wherein an installed lower axle mounting bracket 200 and upper axle mounting bracket (300/400) are depicted with the upper support arm (100A/100B) above;

Fourth step 1640 wherein an upper adjustable axle support bar 700 is depicted installed between the upper support arm (100A/100B) and upper axle mounting bracket (300/400) wherein the first and second mounting elements 710 and 720 have not been clamped using clamping regions 730 and 740 to the central rod 750 allowing the setting of the SMIS ARSS once installed; and Fifth step 1650 wherein a lower axle support bar 600 is depicted installed between the upper support arm (100A/100B) and lower axle mounting bracket (200).

Now referring to FIG. 17, there are depicted first to third steps 1710 to 1730 comprising:

First step 1710 wherein the installer installs limiters comprising a rising limiter and falling limiter for raising/dropping of the axle relative to the vehicle body wherein the rising limiter comprises a hollow pillow which is inserted into the ring 106 on the upper support arm and is retained by interference fit and the falling limiter comprises a resilient member between the upper support arm and the upper axle mounting bracket (optionally the falling limiter may be attached between the upper support arm and the lower axle mounting bracket);

Second step 1720 wherein the installer installs an air bladder on each side of the vehicle between the upper axle mounting brackets (300/400) on the rear axle on either side and the first and second upper arms 100A and 100B respectively; and Third step 1730 wherein replacement shock absorbers are attached on either side of the vehicle wherein the sway bar 500 may be shaped to go around the shock absorbers depending upon the mechanical configuration of the vehicle.

Now referring to FIG. 18, there is depicted first step 1810 wherein the upper adjustable axle support bars 700 on either side of the vehicle are set such that the first and second mounting elements 710 and 720 are spaced equally on either side of the vehicle to a predetermined spacing and clamped to the central rod 750 via clamping regions 730 and 740. Accordingly, once the mechanical installation is completed through flow 1800 prior to installation of the tyres in step 1230 in flow 1200 and completion of the SMIS ARSS installation, the assembled ARSS according to an embodiment of the invention is depicted in first and second images 1910 and 1920 using first and second upper support arms 100A and 100B respectively on the right and left sides of the vehicle, in this case a F-250 truck. Accordingly, the interconnection between the upper support arms 100A and 100B and the upper and lower axle mounting brackets 200 and 300/400 respectively via upper adjustable axle support bars 700 and fixed lower axle support bar 600 can be clearly seen. Equally, sway bar 500 can be seen in first image 1910 running from the upper axle mounting bracket 300/400 to the other side of the truck under the chassis. In each of the first and second images 1900A and 1900B, respectively, the air bladder on either side is also clearly evident between the upper support arms 100A and 100B and the upper axle mounting brackets 300/400 together with their air interconnections and air pressure indicator in second image 1920 (not described during installation for ease).

Accordingly, it would be evident that the SMIS ARSS described in respect of an embodiment of the invention provides for the after sale retrofitting of an air ride suspension system to a vehicle having an OEM installed leaf spring suspension system. Whilst the dimensions and relative positions of elements may change according to the specific vehicle being retrofitted with the ARSS the overall assembly comprises the same elements and their relative positions/associations such as described and depicted within the specification supra. Further, it would be evident to one skilled in the art that the ARSS as described and depicted differs from the SMIS ARSS described within U.S. Pat. No. 8,870,203 also by the inventors.

It would be evident to one skilled in the art that the ARSS as described comprising air bladders disposed on either side of the chassis to the rear axle, the compressor and air tank form part of an air control system associated with the ARSS. The air bladders rely upon an air source, such as the compressor, which draws power from a source such as the motor vehicle itself, i.e. via the battery and/or a generator coupled to the engine. The connection between power supply and compressor is made through a regulator which in conjunction with a sensor determines whether air pressure should be maintained or increased. The sensor within an embodiment of the invention may be a levelling valve that can serve to increase or decrease the pressure in the air bladders as needed. If a decrease in air pressure is required, the levelling valve, can provide air bladders with the means to exhaust air by putting the bladders in fluid communication with the outside environment, thus allowing the bladders to vent. The exhausting of air can be continued until the desired bed level is reached and the levelling valve closes.

Between compressor and the air bladders, is an air tank that can be kept under pressure so that the inflation of the air bladders can be performed quicker than would be possible if they were directly connected to air compressor. When using air tank, flow from the tank can be run through the sensor to the dump valve (which can be implemented as a three way ball valve). In such a configuration, the levelling valve has three states, an inflation state, a maintenance state and a deflation state. The choice of states is controlled by the ride height as determined by levelling valve. The use of a single air passage to each of the air bladders (through both levelling valve and dump valve, for both inflation and deflation, results in an easier to install system. Dump valve can be used to provide the user with the ability to control the ride height of the vehicle bed, or to control the air pressure in tank when the system is powered down.

Whilst a single air bladder is depicted disposed between the upper axle mounting bracket and upper support arm it would be evident that multiple air bladders may be deployed within the same footprint or that with appropriate modification to the upper axle mounting brackets that multiple air bladders may be employed with a larger footprint.

In operation, a sensor determines whether the bed is at the desired level (ride height). The bed can be at the level, in which case, no changes to the air pressure in the air bladders is needed; it can be too high, in which case the air bladders need to be deflated; or it can be too low in which case the air bladders will need to be inflated. When sensor determines the applicable state it selects between its three states. In a first state, a seal is effectively maintained, so that the air pressure in the bladders is maintained. In a second state, the bladders are put into fluid communication with the air tank, which is at a higher pressure than the bladders. The air in the system will seek to find equilibrium, and thus will flow to the air bladders, inflating them in the process. When the desired level has been reached, the sensor will seal access to the bladders. In the third state, the air bladders are put into fluid communication with a lower pressure environment, which can be done by opening a valve to the open atmosphere. Once again, the air in the system will seek equilibrium, which in this case will empty the air bladders. In such a system the regulator provides power to the compressor from the power source based on the air pressure in the tank. Dump valve can be used to provide manual control of the pressure in various components of the system.

In standard operation, dump valve allows the air tank to be in fluid communication with the air bladders, a communication controlled by sensor. However, when in a powered off state, the user may want to lower the bed of the vehicle which is achieved by venting the air bladders to the atmosphere. In such a case, dump valve can be used to empty the bladders. In some embodiments, dump valve can also be used to vent pressurized air stored in tank if so desired. Additional control elements including check valves, shut off valves and couplers to allow the pressure in the air tank to be released can be provided. The use of these systems will be well understood by those skilled in the art.

It would be evident that other types of sensors can be employed as sensor. In the illustrated embodiments, a levelling valve is employed to allow for the creation of a simple pneumatic control system. This valve can be preset so that there is a desired level at which the bed of the trailer is to be maintained. When the bed of the trailer is not at this level, air pressure in the bladders is increased or decreased accordingly. Optionally, an air gauge can be employed to measure the pressure in the suspension system, which is directly related to the pressure in bladders. Because the weight of the bed in any given installation is constant, when the bed is level the pressure of the suspension system is directly proportional to the weight of the load carried by the vehicle. Thus an air gauge can also be employed to provide a rudimentary load scale on the vehicle.

Though described above as using a mechanical control system regulated by a levelling valve, the system of the present invention can be controlled through the use of an electronic control system that can be responsive to a number of different inputs, such as the height differential between the upper support arm and the upper axle mounting, the angle between the upper support arm and the trailing arms upper or lower axle mounting, a direct measure of the ride height, or a manual input such as one set through external controller interface. Those skilled in the art will appreciate that the implementation of such a system does not depart from the scope of the present invention.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An air ride suspension kit formed as a replaceable unit for converting a motor vehicle having a solid rear axle supported by a leaf spring suspension assembly to one supported by an air ride suspension assembly, said kit comprising for a side of the vehicle:
   a) an upper support arm to be positioned above the axle and configured for removable attachment in a fixed non-adjustable predetermined location relative to the chassis of the motor vehicle;
   b) first and second connectors at each end of the upper support arm, each connector being configured to receive pre-existing leaf spring mounting posts such that when a leaf spring set has been detached and removed from leaf spring attachment sites the upper support arm can be mounted to the leaf attachment sites by at least the leaf spring mounting posts and wherein the first and second leaf spring attachment sites are disposed to the front and rear of the motor vehicle either side of the axle;
   c) an upper axle mounting plate and a lower axle mounting plate, each configured for removable attachment to each other and for mounting to the respective top and bottom of the axle in a predetermined location;
   d) an upper adjustable support bar for removable attachment between the upper axle mounting plate and a predetermined position on the upper support arm;
   e) a lower support bar for removable attachment between the lower axle mounting plate and a predetermined position on the upper support arm; and
   f) an air bladder forming part of an air control system, wherein the air bladder is disposed between the upper axle mounting plate and the upper support arm.

2. The air ride suspension kit according to claim 1, wherein
   the upper adjustable support bar and the lower support bar are both disposed on the same side of the axle.

3. The air ride suspension kit according to claim 1, further comprising
   a first limiter disposed on the upper support arm towards the axle for limiting motion of the axle and upper support arm towards each other; and
   a second limiter disposed between the upper support aim and at least one of the upper axle mounting plate and the lower axle mounting plate for limiting the motion of the axle and upper support arm away from each other.

4. An air ride suspension kit formed as a replaceable unit for converting a motor vehicle having a solid rear axle supported by a leaf spring suspension assembly to one supported by an air ride suspension assembly, said kit comprising:
first and second air ride suspension assemblies for each side of the vehicle, each air ride suspension assembly comprising:
a) an upper support arm to be positioned above the axle and configured for removable attachment in a fixed non-adjustable predetermined location relative to the chassis of the motor vehicle;
b) first and second connectors at each end of the upper support arm, each connector being configured to receive pre-existing leaf spring mounting posts such that when a leaf spring set has been detached and removed from leaf spring attachment sites the upper support arm can be mounted to the leaf attachment sites by at least the leaf spring mounting posts and wherein the first and second leaf spring attachment sites are disposed to the front and rear of the motor vehicle either side of the axle;
c) an upper axle mounting plate and a lower axle mounting plate, each configured for removable attachment to each other and for mounting to the respective top and bottom of the axle in a predetermined location;
d) an upper adjustable support bar for removable attachment between the upper axle mounting plate and a predetermined position on the upper support arm;
e) a lower support bar for removable attachment between the lower axle mounting plate and a predetermined position on the upper support arm; and
f) an air bladder forming part of an air control system, wherein the air bladder is disposed between the upper axle mounting play plate and the upper support arm; and
a sway bar for connecting between the first and second air ride suspension assemblies at predetermined locations on each once the first and second air ride suspension assemblies have been mounted to the vehicle.

5. The air ride suspension kit according to claim 4, wherein
the upper adjustable support bar and the lower support bar are both disposed on the same side of the axle.

6. The air ride suspension kit according to claim 4, further comprising
a first limiter disposed on the upper support arm towards the axle for limiting motion of the axle and upper support arm towards each other; and
a second limiter disposed between the upper support aim and at least one of the upper axle mounting plate and the lower axle mounting plate for limiting the motion of the axle and upper support arm away from each other.

7. The air ride suspension kit according to claim 4, further comprising
an air tank and air tank mounting brackets for mounting the air tank to the motor vehicle to provide air under pressure to the air bladders when the air ride suspension is installed and operational; and
an air compressor and compressor mounting brackets for mounting the air compressor to the motor vehicle and maintaining the air within the air tank at a predetermined minimum pressure when the air ride suspension is installed and operational.

8. A method of converting the rear suspension of a motor vehicle, comprising:
removing left and right leaf spring assemblies from their locations;
assembling an air ride suspension kit in place of the left and right leaf spring assemblies, said kit comprising:
a) an upper support arm to be positioned above the axle and configured for removable attachment in a fixed non-adjustable predetermined location relative to the chassis of the motor vehicle;
b) first and second connectors at each end of the upper support arm, each connector being configured to receive pre-existing leaf spring mounting posts such that when the leaf spring set are detached and removed from leaf spring attachment sites the upper support arm can be mounted to the leaf attachment sites by at least the leaf spring mounting posts and wherein the first and second leaf spring attachment sites are disposed to the front and rear of the motor vehicle either side of the axle;
c) an upper axle mounting plate and a lower axle mounting plate, each configured for removable attachment to each other and for mounting to the respective top and bottom of the axle in a predetermined location;
d) an upper adjustable support bar for removable attachment between the upper axle mounting plate and a predetermined position on the upper support arm;
e) a lower support bar for removable attachment between the lower axle mounting plate and a predetermined position on the upper support arm; and
f) an air bladder forming part of an air control system, wherein the air bladder is disposed between the upper axle mounting plate and the upper support arm; and
assembling an air system onto the motor vehicle, said system comprising:
g) an air tank and air tank mounting brackets for mounting the air tank to the motor vehicle to provide air under pressure to the air bladders when the air ride suspension is installed and operational;
h) an air compressor and compressor mounting brackets for mounting the air compressor to the motor vehicle and maintaining the air within the air tank at a predetermined minimum pressure when the air ride suspension is installed and operational;
i) a sensor linked to a control system for controlling the air compressor;
j) a control valve for controlling at least one of the ingress and egress of air with respect to the air bladders; and
k) tubing to link the air compressor, the air tank, the control valve, and the air bladders in predetermined configuration.

9. The method according to claim 8, further comprising
connecting the first and second air ride suspension assemblies at predetermined locations with an adjustable sway bar on each once the first and second air ride suspension assemblies have been mounted to the vehicle.

10. The method according to claim 8, wherein
the upper adjustable support bar and the lower support bar are both disposed on the same side of the axle.

11. The method according to claim 8, further comprising
a first limiter disposed on the upper support arm towards the axle for limiting motion of the axle and upper support arm towards each other; and
a second limiter disposed between the upper support aim and at least one of the upper axle mounting plate and the lower axle mounting plate for limiting the motion of the axle and upper support arm away from each other.

* * * * *